(12) United States Patent
Paolini et al.

(10) Patent No.: US 10,822,102 B2
(45) Date of Patent: Nov. 3, 2020

(54) ADJUSTABLE LENGTH BEAM BETWEEN COWL HINGES

(71) Applicant: ROHR, INC., Chula Vista, CA (US)

(72) Inventors: Thomas Paolini, Santee, CA (US); Marc Schommer, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 603 days.

(21) Appl. No.: 15/625,900

(22) Filed: Jun. 16, 2017

(65) Prior Publication Data

US 2018/0362174 A1 Dec. 20, 2018

(51) Int. Cl.
*B64D 29/06* (2006.01)
*B64D 27/16* (2006.01)
*B64D 29/08* (2006.01)

(52) U.S. Cl.
CPC .............. *B64D 29/06* (2013.01); *B64D 27/16* (2013.01); *B64D 29/08* (2013.01)

(58) Field of Classification Search
CPC .......... B64D 29/06; B64D 29/08; B64D 27/16
See application file for complete search history.

(56) References Cited

U.S. PATENT DOCUMENTS

| | | | |
|---|---|---|---|
| 4,320,912 A | 3/1982 | Grace et al. | |
| 5,076,514 A | 12/1991 | Melcher | |
| 5,518,206 A * | 5/1996 | Arnold | B64D 29/06 244/129.4 |
| 5,984,382 A * | 11/1999 | Bourne | B64D 29/06 292/113 |
| 6,666,408 B1 * | 12/2003 | De Carvalho | B64D 29/00 244/129.4 |
| 7,843,363 B2 * | 11/2010 | Grichener | B64D 29/06 340/426.29 |
| 8,002,217 B2 | 8/2011 | Sternberger | |
| 8,959,889 B2 | 2/2015 | Howe | |
| 9,410,501 B2 | 8/2016 | Aten | |
| 9,470,107 B2 | 10/2016 | Byrne | |
| 2003/0102405 A1 * | 6/2003 | McEvoy | B64D 29/04 244/54 |
| 2016/0010502 A1 * | 1/2016 | Byrne | B64D 33/00 415/213.1 |

* cited by examiner

*Primary Examiner* — Justin M Benedik (74) *Attorney, Agent, or Firm* — Snell & Wilmer L.L.P.

(57) ABSTRACT

A nacelle may include a pylon, an adjustable length beam, a first fan cowl, and a second fan cowl. The adjustable length beam may have a first end and a second end and the adjustable length beam may extend in a direction substantially normal to a centerline axis of the nacelle. The first fan cowl may be pivotally coupled to the first end of the adjustable length beam and additionally may be pivotally coupled to the pylon. The second fan cowl may be pivotally coupled to the second end of the adjustable length beam and additionally may be pivotally coupled to the pylon.

16 Claims, 5 Drawing Sheets

ADJUSTABLE LENGTH BEAM BETWEEN COWL HINGES

FIELD

The present disclosure relates to gas turbine engines, and more specifically, to nacelles for gas turbine engines.

BACKGROUND

Aircraft generally include a nacelle and a gas turbine engine for propulsion. Conventional nacelles often include a pair of fan cowls pivotally connected to a fixed structure, such as a pylon connecting the nacelle to a wing of an aircraft. Such fan cowls, may be configured to pivot between open and closed positions, thereby allowing access to components of the gas turbine engine in the open position and forming an aerodynamic shell over the components of the gas turbine engine in the closed position. The pair of fan cowls includes a left and right fan cowl, or inboard and outboard fan cowl. Each fan cowl extends through an arc of approximately 180 degrees around the engine, and more particularly around the fan case of the engine. The split lines between the left and right fan cowls are at the 12 o'clock or top position and 6 o'clock or bottom position. At the 12 o'clock position or top of each fan cowl, they are typically pivotally connected to fixed structure via a set of one or more hinges. The hinges allow the fan cowls to open pivotally outward. At the 6 o'clock position or bottom of each fan cowl, they are typically latched to one another to hold the fan cowls in a closed or latched position during aircraft flight.

In some designs, the pair of fan cowls may include a number of fixed hinges at the approximately 12 o'clock position that are pivotally attached to fixed structure, and one or more pairs of floating hinges that are connected directly together through a tie rod. In other words, there may be a hinge on the right fan cowl that is connected to the corresponding hinge on the left fan cowl via this tie rod, which is sometimes referred to as a hinge beam.

The size and shape of the pair of fan cowls, the position of the hinge points of the hinges, the position of the 6 o'clock latches and other geometric details of the fan cowl and the adjacent structure are carefully controlled so as to minimize the aerodynamic discontinuities between them.

However, fan cowls may not be perfectly flush with adjacent structure of the nacelle and these aerodynamic discontinuities (typically referred to as steps and gaps) across interfaces/junctions between the fan cowl and the adjacent structure of the nacelle contribute to aircraft drag and inefficiency.

SUMMARY

In various embodiments, the present disclosure provides a nacelle that includes an adjustable length beam that includes a first end and a second end. The nacelle may also include a first cowl pivotally coupled to the first end of the adjustable length beam and a second cowl pivotally coupled to the second end of the adjustable length beam. In various embodiments, the nacelle further includes a support structure, wherein the first cowl and the second cowl are pivotally coupled to the support structure. In various embodiments, the support structure is a pylon. Adjustments to a length of the adjustable length beam may adjust a load to the first cowl and the second cowl.

In various embodiments, the first cowl is a first fan cowl and the second cowl is a second fan cowl. In various embodiments, the nacelle further includes an inlet structure and, in response to the load, a first interface between the first fan cowl and the inlet structure and a second interface between the second fan cowl and the inlet structure may be substantially flush. The first interface may be a first junction between a first forward leading edge of the first fan cowl and a first aft trailing edge of the inlet structure and the second interface may be a second junction between a second forward leading edge of the second fan cowl and a second aft trailing edge of the inlet structure.

In various embodiments, the adjustable length beam is indirectly coupled to the support structure via the first cowl and the second cowl. In various embodiments, a position of at least one of the first end and the second end of the adjustable length beam is adjustable to change a length of the adjustable length beam. In various embodiments, positions of both the first end and the second end of the adjustable length beam are adjustable to change the length of the adjustable length beam. In various embodiments, the adjustable length beam extends in a direction substantially perpendicular to a centerline axis of the nacelle. In various embodiments, the adjustable length beam is indirectly coupled to the pylon via the first fan cowl and the second fan cowl.

Also disclosed herein, according to various embodiments, is a method of maintaining a nacelle. The method may include determining whether an adjustment to a load on a first fan cowl and a second fan cowl is warranted and adjusting a length of an adjustable length beam extending between the first fan cowl and the second fan cowl. The first fan cowl may be pivotally coupled to a first end of the adjustable length beam and the second fan cowl may be pivotally coupled to a second end of the adjustable length beam.

In various embodiments, determining whether the adjustment to the load on the first fan cowl and the second fan cowl is warranted comprises inspecting a first interface between the first fan cowl and an inlet structure and a second interface between the second fan cowl and the inlet structure to determine if the first interface and the second interface are substantially flush. In various embodiments, adjusting the length of the adjustable length beam comprises changing a position of at least one of the first end and the second end of the adjustable length beam. In various embodiments, adjusting the length of the adjustable length beam is performed with at least one of the first fan cowl and the second fan cowl in an open position.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a nacelle. As used herein, "forward" refers to the direction associated with the intake (e.g., the front end) of a nacelle.

A first component that is "radially outward" of a second component means that the first component is positioned at a greater distance away from a centerline axis of a nacelle (e.g., an engine central longitudinal axis) than the second component. A first component that is "radially inward" of a second component means that the first component is positioned closer to the centerline axis than the second component. The terminology "radially outward" and "radially inward" may also be used relative to references other than the centerline axis of a nacelle.

Figure 1:
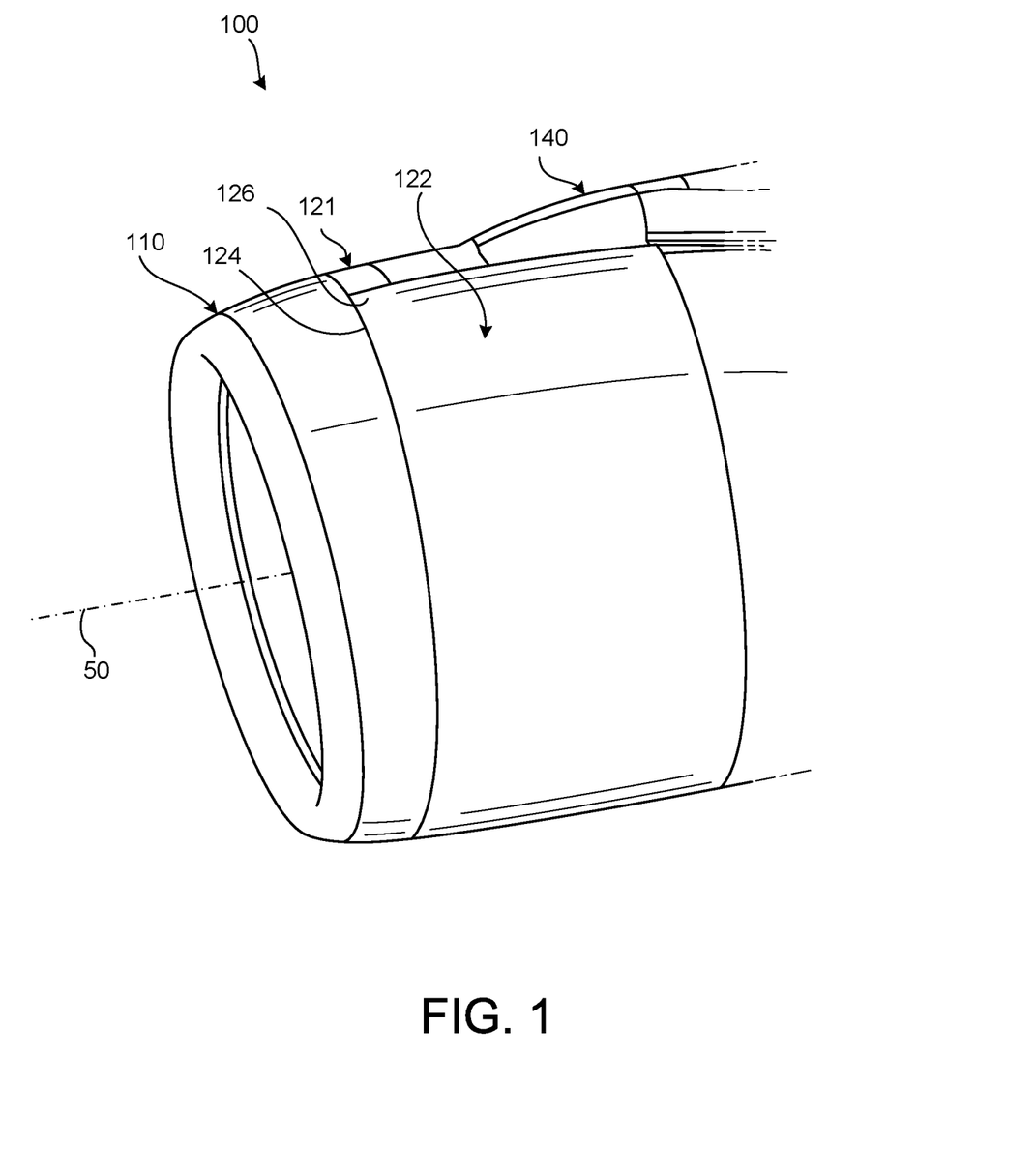
FIG. 1 illustrates a perspective view of a nacelle for a gas turbine engine, in accordance with various embodiments.

With reference to FIG. 1, a nacelle 100 for a gas turbine engine is illustrated according to various embodiments. The nacelle 100 may be suitable for an aircraft and the nacelle 100 may be coupled to a pylon 140, which may mount the nacelle 100 to an aircraft wing or aircraft body. The nacelle 100 may have a centerline 50 and may include an inlet 110, a fan cowl, and a thrust reverser. Fan cowl may include two halves (e.g., a first fan cowl 121 and a second fan cowl 122) that are pivotally/pivotally mounted to pylon 140 via one or more hinges, as described in greater detail below. Thus, the nacelle 100 may include a first fan cowl 121, which may be a right-hand (RH) fan cowl, and a second fan cowl 122, which may be a left-hand (LH) fan cowl that can be pivoted between open and closed positions (e.g., allowing access to components within the nacelle 100).

Figure 2:
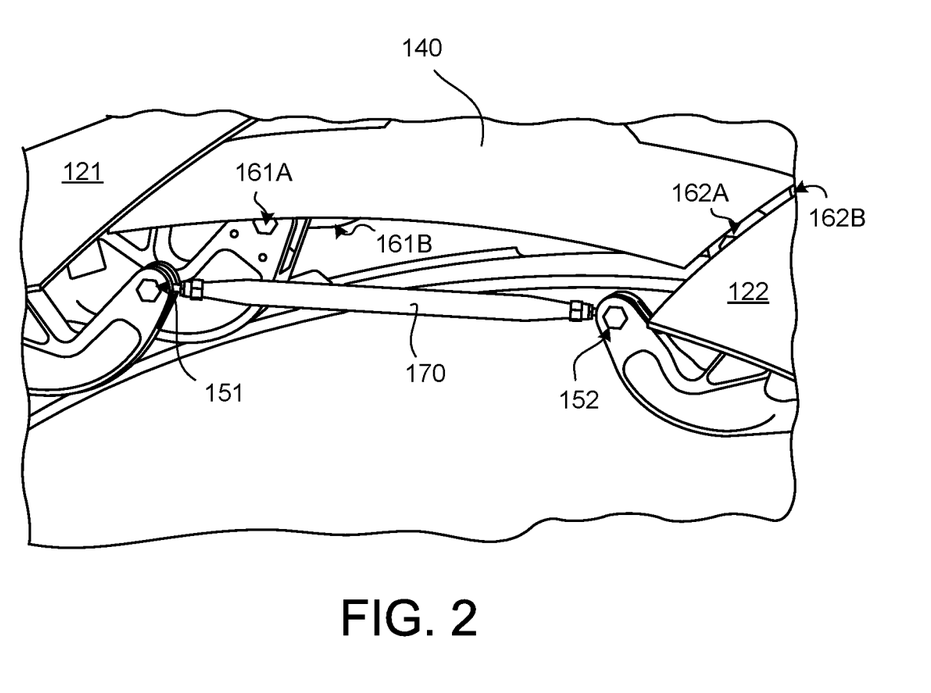
FIG. 2 illustrates a perspective view of an adjustable length beam of a nacelle, in accordance with various embodiments.

In various embodiments, and with reference to FIG. 2, an adjustable length beam 170 of nacelle 100 is provided. As mentioned above, cowls, such as conventional fan cowls, may be improperly aligned with adjacent structures and thus steps, gaps, and/or other aerodynamic discontinuities may exist at adjoining interfaces 124. In various embodiments, these discontinuities may only be apparent during flight (e.g., in response to the aircraft experiencing flight loads). For example, upon initial installation/assembly of the nacelle 100, the cowls may appear to be properly aligned and the misalignment may become apparent in flight or after a certain number of flights. These discontinuities often increase the drag of conventional nacelles and thus lower the aerodynamic performance of conventional nacelles. Accordingly, the subject matter of the present disclosure provides an adjustable length beam 170, with reference to FIG. 2, that can be implemented with cowls of nacelles to overcome at least some of these aforementioned shortcomings, according to various embodiments. For example, without the adjustable length beam 170, a fan cowl (e.g., first fan cowl 121) of a nacelle (e.g., nacelle 100) would potentially deflect radially outward and thus would potentially result in aerodynamic discontinuities at the interface/junction 124 (with reference to FIG. 1) between the fan cowl and adjacent structure (e.g., inlet structure 110, such as fan cowl support beam or forward secondary structure).

While numerous details are included herein pertaining to implementing the adjustable length beam 170 with fan cowls 121, 122 of gas turbine engines, the adjustable length beam 170 may be useful in other implementations, such as with other sections of the nacelle 100 or other aircraft access doors, etc. Also, the nacelle inlet structure 110 and various components, such as the gas turbine engine housed within the nacelle 100, are hidden (not visible) in FIG. 2 to avoid obscuring the clarity of the depiction of the hinges 151, 152 and the adjustable length beam 170.

Figure 3:
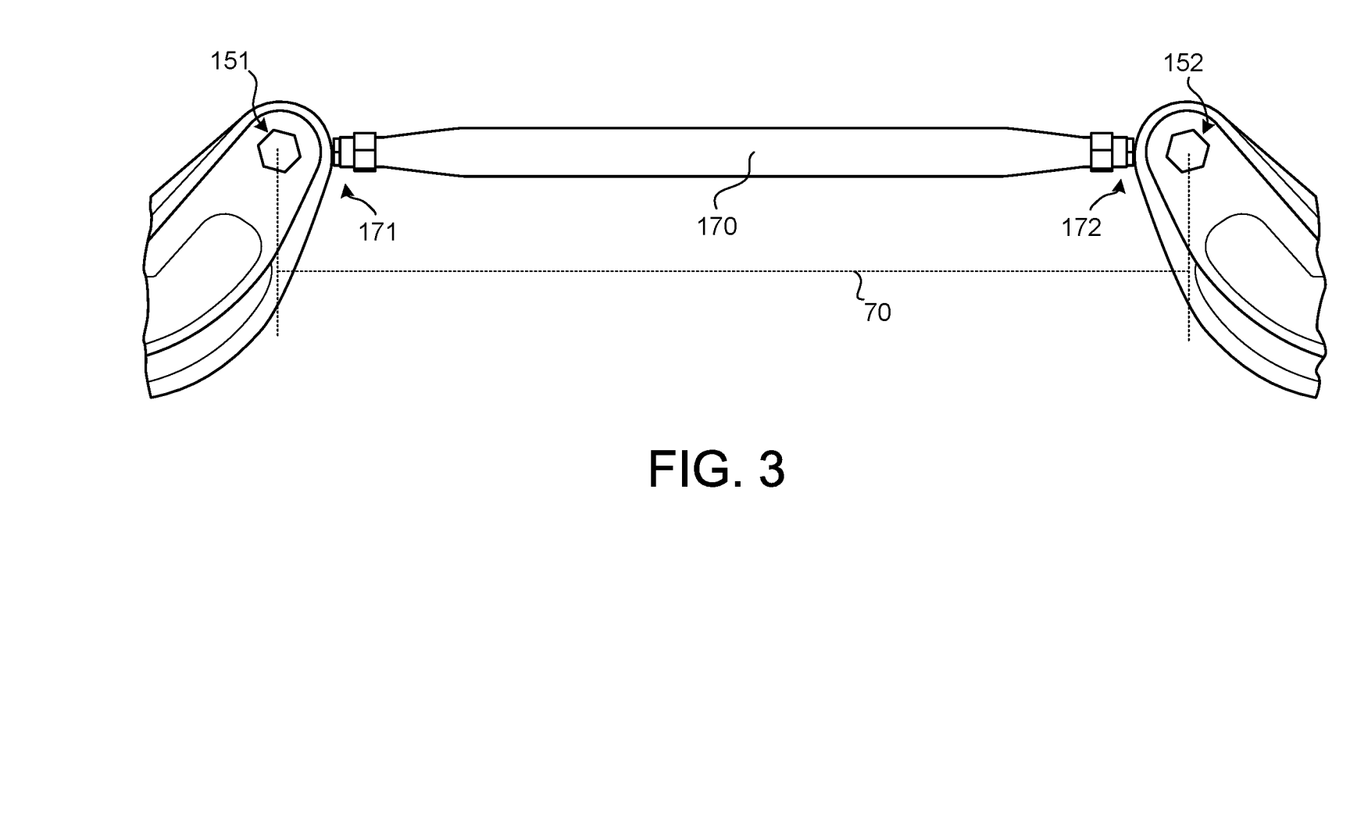
FIG. 3 illustrates a magnified view of an adjustable length beam, in accordance with various embodiments.

In various embodiments, and with reference to FIGS. 1, 2, and 3, the adjustable length beam 170 may have a first end 171 and a second end 172. A first cowl, such as a first fan cowl 121 may be pivotally coupled to the first end 171 of the adjustable length beam 170 and a second cowl, such as a second fan cowl 122, may be pivotally coupled to the second end 172 of the adjustable length beam 170. Said differently, the first fan cowl 121 may be coupled to the adjustable length beam 170 via a first hinge 151 and the second fan cowl 122 may be coupled to the adjustable length beam 170 via a second hinge 152. In various embodiments, the adjustable length beam 170 extends in a direction substantially normal to the centerline axis 50 of the nacelle 100. Typically the first hinge 151 and the second hinge 152 are the forward-most hinges (where forward is the direction ahead of the aircraft direction of flight) supporting the first fan cowl 121 and second fan cowl 122, respectively.

Generally, the adjustable length beam 170 has an adjustable length 70 and changes to the length 70 correspond to changes in the relative position of the associated hinge points on the first and second fan cowls 121, 122. Changes to the length 70 may also adjust a pre-load imparted to the first and second fan cowls 121, 122 when they are in the closed position and latched together, which will be discussed in more detail below. The changes to the hinge point positions and pre-load affect the orientation, shape, geometry, and/or overall fit of the fan cowls 121, 122 about the nacelle 100. Said differently, adjustments to the length 70 of the adjustable length beam 170 affects the circumferential fit of the fan cowls 121, 122 relative to adjacent structure, such as the inlet structure 110. For example, shortening the length 70 of the adjustable length beam 170 may pull portions, such as a forward corner section 126 (FIG. 1), of the fan cowls 121, 122 radially inwards to improve the aerodynamic continuity at the interface 124 (FIG. 1) between the fan cowls 121, 122 and the inlet structure 110, according to various embodiments. In various embodiments, the length 70 of the adjustable length beam 170 may be adjusted prior to installing/assembling the nacelle 100, and/or it may be adjusted after the adjustable length beam 170 is installed/assembled on an aircraft.

In various embodiments, and with continued reference to FIGS. 1, 2, and 3, the nacelle 100 includes a support structure, such as pylon 140. The first fan cowl 121 and the second fan cowl 122 may also be pivotally coupled to the support structure (e.g., pylon 140). Said differently, the first fan cowl 121 may be coupled to the pylon 140 via one or more first fixed hinges 161A, 161B and the second fan cowl 122 may be coupled to the pylon 140 via one or more second fixed hinges 162A, 162B. In various embodiments, and with continued reference to FIG. 2, the first and second fixed hinges 161A, 161B, 162A, 162B are directly mounted to the support structure (e.g., the pylon 140) while the first hinge 151 and the second hinge 152 are indirectly mounted to the support structure via the first and second fan cowls 121, 122. Thus, the first and second hinges 151, 152 may be referred to as "floating" hinges because they are not directly mounted to the support structure (e.g., pylon 140). In various embodiments, the adjustable length beam 170 provides a level of support to these "floating" hinges 151, 152 while allowing the distance between the first hinge 151 and the second hinge 152 to be changed. The adjustable length beam 170 may provide circumferential continuity between the two fan cowls 121, 122 (e.g. hoop continuity).

In various embodiments, adjusting the length 70 of the adjustable length beam 170 to be shorter increases the tension in the adjustable length beam 170 and helps impart or adjust a corresponding generally circumferential or hoop pre-load into the first and second fan cowls 121, 122. As mentioned above, in response to the change in length 70 of the adjustable length beam 170, the first and second fan cowls 121, 122 may be deflected (e.g., radially inwards) by this pre-load such that a first interface between the first fan cowl 121 and the inlet structure 110, for example, and a second interface between the second fan cowl 122 and the inlet structure 110, for example, are substantially flush to improve the aerodynamic performance of the nacelle by reducing the surface aerodynamic discontinuities at the interfaces during flight conditions (e.g., flight loads). Additionally, adjusting the amount of circumferential pre-load in the pair of fan cowl panels 121, 122 can ensure that if any step or gap does exist, the resultant aerodynamic force on the leading edge of the fan cowls from the slipstream airflow will not cause any great deflections or scooping.

Figure 4:
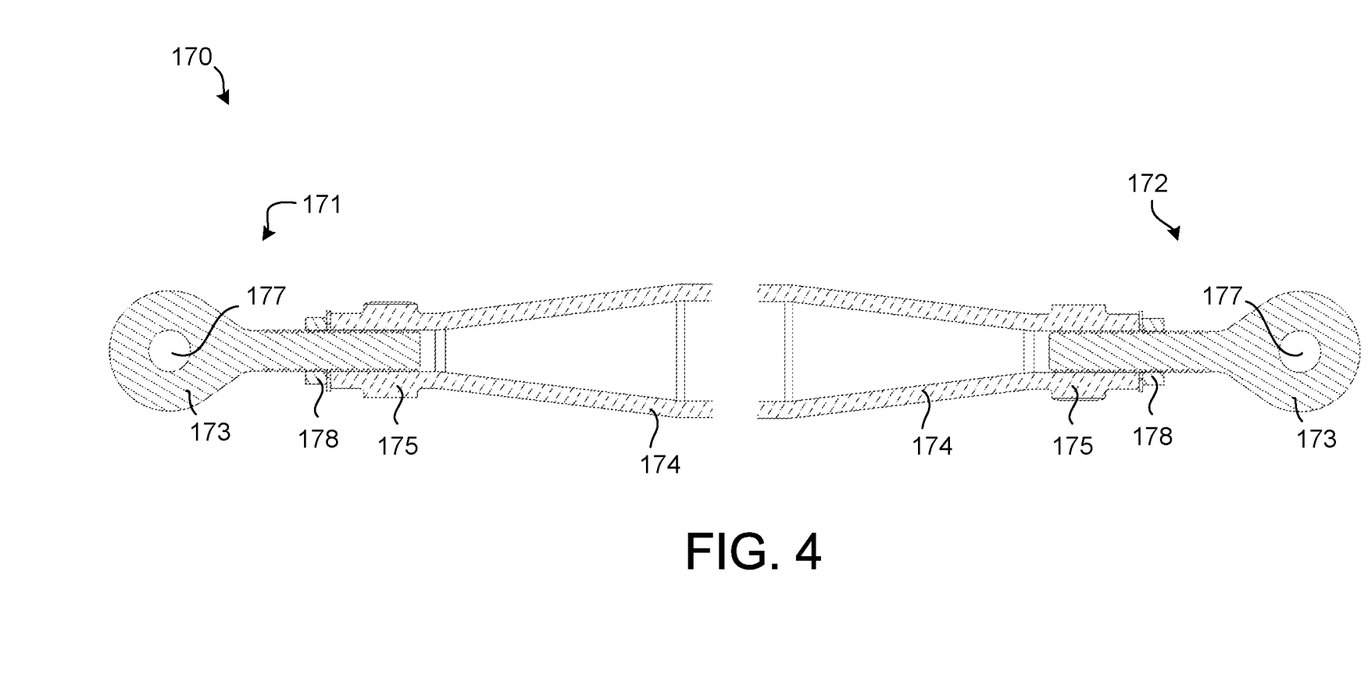
FIG. 4 illustrates a magnified view of ends of an adjustable length beam, in accordance with various embodiments.

In various embodiments, and with reference to FIG. 4, a position of at least one of the first end 171 and the second end 172 of the adjustable length beam 170 is adjustable to change the length 70 of the adjustable length beam 170. In various embodiments, positions of both the first end 171 and the second end 172 of the adjustable length beam 170 may be adjustable to change the length 70 of the adjustable length beam 170. For example, one or both of the ends 171, 172 of the adjustable length beam 170 may have a threaded bolt 173 engaged with a body 174 of the adjustable length beam 170 assembly. Rotating the bolt 173 relative to the body 174 may alter the length 70 of the adjustable length beam 170. The adjustable length beam 170 may include one or more flats 175 configured to fit a wrench or other tool to facilitate the rotation of the body 174 relative to the bolt 173. The sets of threads between the respective ends of body 174 and each bolt 173 may be formed in opposite directions, such that turning the body 174 may cause both of the bolts 173 to be simultaneously retracted or extended relative thereto. Lock nuts 178 may be included in order to lock the bolts 173 to each end of the body 174 when they are adjusted to the desired relative position. In various embodiments, the bolts 173 are configured to connect to the hinges 151, 152 and thus may include an eye-hole 177 or other feature through which a hinge pin of hinges 151, 152 may be inserted. It is expected that the adjustable length beam 170 may include other structures and/or features for achieving the variable length ability described herein, and thus the structure of the adjustable length beam 170 is not necessarily limited to the specific structure shown in FIG. 4.

Figure 5:
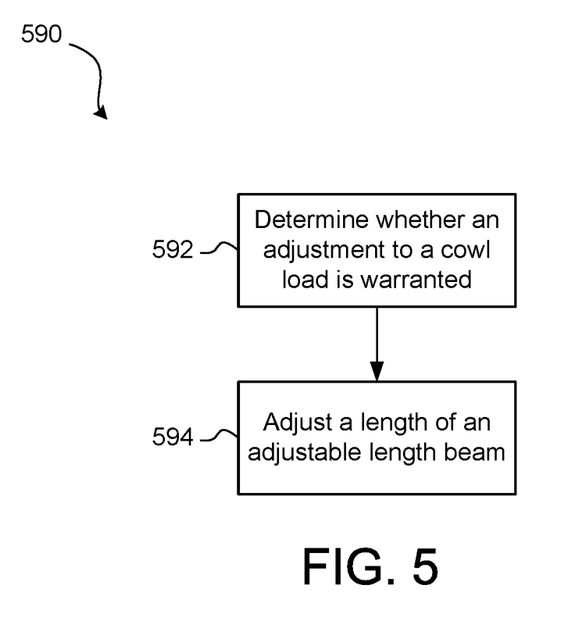
FIG. 5 is a schematic flow chart diagram of a method maintaining a nacelle, in accordance with various embodiments.

In various embodiments, and with reference to FIG. 5, a method 590 of maintaining and/or adjusting a nacelle is provided. The method 590 includes, according to various embodiments, determining whether an adjustment to a cowl load is warranted at step 592 and adjusting a length of an adjustable length beam at step 594. In various embodiments, step 592 includes determining whether first and second fan cowls of a nacelle are properly aligned and flush with adjacent structure, such as an inlet structure. For example, step 592 may include inspecting a first interface between the first fan cowl and an inlet structure and a second interface between the second fan cowl and the inlet structure to determine if the first interface and the second interface are substantially flush (e.g., inspecting the continuity of the interface). In various embodiments, this determining step 592 may include waiting for a passage of time or waiting for a predetermined number of operational hours of the gas turbine engine, a predetermined number of take-offs, etc. Thus, adjusting the adjustable length beam at step 594 may be a periodic procedure that helps to maintain the aerodynamics of the nacelle 100 over time.

In response to determining that the fan cowls are not sufficiently flush with adjacent structure (e.g., determining that an adjustment to the cowl load is warranted), step 594 may be performed. Said differently, step 594, according to various embodiments, may be contingent upon the determination at step 592. In various embodiments, adjusting the length of the adjustable length beam (step 594) includes changing a position of at least one of the first end and the second end of the adjustable length beam. In various embodiments, adjusting the length of the adjustable length beam (step 594) is performed with at least one of the first fan cowl and the second fan cowl in an open position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A nacelle comprising:
an adjustable length beam comprising a first end and a second end;
a first cowl pivotally and directly coupled to the first end of the adjustable length beam; and
a second cowl pivotally and directly coupled to the second end of the adjustable length beam;
wherein the first cowl is a first fan cowl and the second cowl is a second fan cowl.

2. The nacelle of claim 1, further comprising a support structure, wherein the first cowl and the second cowl are pivotally coupled to the support structure.

3. The nacelle of claim 2, wherein the adjustable length beam is configured to remain in a fixed orientation relative to the support structure as the first cowl and the second cowl transition between open and closed positions.

4. The nacelle of claim 2, wherein adjustments to a length of the adjustable length beam adjust a load to the first cowl and the second cowl.

5. The nacelle of claim 1, wherein the nacelle further comprises an inlet structure, wherein in response to the load, a first interface between the first fan cowl and the inlet structure and a second interface between the second fan cowl and the inlet structure are substantially flush.

6. The nacelle of claim 5, wherein the first interface is a first junction between a first forward leading edge of the first fan cowl and a first aft trailing edge of the inlet structure and the second interface is a second junction between a second forward leading edge of the second fan cowl and a second aft trailing edge of the inlet structure.

7. The nacelle of claim 2, wherein the adjustable length beam is only indirectly coupled to the support structure via the first cowl and the second cowl.

8. The nacelle of claim 7, wherein a coupling between the first end of the adjustable length beam and the first fan cowl is a first floating hinge and a coupling between the second end of the adjustable length beam and the second cowl is a second floating hinge; wherein the first floating hinge and the second floating hinge are indirectly coupled to the support structure via one or more fixed hinges, wherein the one or more fixed hinges are disposed aft of the first floating hinge and the second floating hinge.

9. The nacelle of claim 8, wherein positions of both the first end and the second end of the adjustable length beam are adjustable to change the length of the adjustable length beam.

10. The nacelle of claim 1, wherein the adjustable length beam is configured to be in tension in response to the first cowl and the second cowl being coupled together at a bottom position of the nacelle.

11. A nacelle comprising:
a pylon;
an adjustable length beam comprising a first end and a second end, wherein the adjustable length beam extends in a direction substantially perpendicular to a centerline axis of the nacelle;
a first fan cowl pivotally coupled to the first end of the adjustable length beam and pivotally coupled to the pylon; and
a second fan cowl pivotally coupled to the second end of the adjustable length beam and pivotally coupled to the pylon;
wherein the adjustable length beam is configured to remain in a fixed orientation relative to the pylon in response to the first fan cowl transitioning between open and closed positions.

12. The nacelle of claim 11, wherein adjustments to a length of the adjustable length beam adjust a load to the first fan cowl and the second fan cowl.

13. The nacelle of claim 12, wherein the nacelle further comprises an inlet structure, wherein in response to adjustments to the load, a first interface between the first fan cowl and the inlet structure and a second interface between the second fan cowl and the inlet structure are substantially flush.

14. The nacelle of claim 11, wherein the adjustable length beam is indirectly coupled to the pylon via the first fan cowl and the second fan cowl.

15. The nacelle of claim 11, wherein a position of at least one of the first end and the second end of the adjustable length beam is adjustable to change a length of the adjustable length beam.

16. A method of maintaining a nacelle, the method comprising:
- determining whether a first fan cowl of the nacelle is substantially flush with an inlet structure of the nacelle at an interface between the two;
- in response to determining that the first fan cowl is not substantially flush with the inlet structure at the interface, adjusting a length of an adjustable length beam extending between the first fan cowl and a second fan cowl, wherein the adjustable length beam is configured to remain in a fixed orientation relative to the inlet structure in response to the first fan cowl transitioning between open and closed positions.

* * * * *